(12) United States Patent
Pozgainer et al.

(10) Patent No.: US 8,844,754 B2
(45) Date of Patent: Sep. 30, 2014

(54) FUEL TANK HAVING A BUILT-IN AUXILIARY TANK

(75) Inventors: Guenther Pozgainer, Graz (AT); Mark Polifke, Frechen (DE)

(73) Assignee: MAGNA STEYR Fuel Systems GesmbH, Sinabelkirchen (AT)

( * ) Notice: Subject to any disclaimer, the term of this patent is extended or adjusted under 35 U.S.C. 154(b) by 0 days.

(21) Appl. No.: 13/145,326

(22) PCT Filed: Jan. 22, 2010

(86) PCT No.: PCT/EP2010/050740
§ 371 (c)(1),
(2), (4) Date: Jul. 19, 2011

(87) PCT Pub. No.: WO2010/084178
PCT Pub. Date: Jul. 29, 2010

(65) Prior Publication Data
US 2011/0272412 A1  Nov. 10, 2011

(30) Foreign Application Priority Data
Jan. 22, 2009 (DE) .................. 10 2009 005 826

(51) Int. Cl.
B65D 88/12 (2006.01)
(52) U.S. Cl.
USPC ......... 220/562; 220/4.14; 220/4.13; 220/563; 220/564; 220/746; 137/587

(58) Field of Classification Search
USPC ............ 220/4.14, 4.13, 567.2, 562, 563, 564, 220/586, 555, 746; 137/587, 588, 583, 584, 137/585, 592
See application file for complete search history.

(56) References Cited

U.S. PATENT DOCUMENTS 3,645,416 A * 2/1972 Main, Jr. ................. 220/563
4,531,653 A 7/1985 Sakata
(Continued)

FOREIGN PATENT DOCUMENTS

| CA | 2318653 A1 | 3/2001 |
|---|---|---|
| DE | 19909041 A1 | 9/2000 |

(Continued)

*Primary Examiner* — Andrew Perreault
(74) *Attorney, Agent, or Firm* — Bachman & LaPointe, P.C.

(57) ABSTRACT

A fuel tank made of plastic, in the interior of which an insert (2) is located, wherein the insert should enclose a space (3), wherein the fuel tank should offer the greatest possible economy of space, and the fuel tank and the insert should have a simple form. For this purpose, a box made of plastic and open at the top is attached to the inside of the upper wall (1) of the fuel tank as an insert (2), wherein the box forms a closed space (3) together with the wall (1) of the tank, wherein the insert (2) comprises a bottom (5) and side walls (6, 7, 8, 9), the upper edges of which are connected in a bonded manner to the wall (1) of the tank. The insert (2) contains inner parts (20-26) that are integral therewith and has at least one fitting (13-16) on the side walls (6, 7, 8, 9) for connecting a pipe line.

3 Claims, 5 Drawing Sheets

(56) References Cited

U.S. PATENT DOCUMENTS

| | | | |
|---|---|---|---|
| 5,211,900 A * | 5/1993 | Ziegler | 264/263 |
| 6,530,393 B2 * | 3/2003 | Reinelt | 137/592 |
| 6,557,581 B2 * | 5/2003 | Ehrman et al. | 137/587 |
| 6,591,866 B2 | 7/2003 | Distelhoff et al. | |
| 6,698,475 B2 | 3/2004 | Schaefer et al. | |
| 6,834,771 B2 | 12/2004 | Suzuki et al. | |
| 6,948,523 B2 | 9/2005 | Viebahn | |
| 7,047,948 B2 | 5/2006 | Gerhardt et al. | |
| 2002/0069840 A1 * | 6/2002 | Bohm, II | 220/562 |
| 2006/0144842 A1 * | 7/2006 | Boehmer et al. | 220/563 |
| 2008/0149642 A1 | 6/2008 | Borchert et al. | |

FOREIGN PATENT DOCUMENTS

| | | |
|---|---|---|
| DE | 19932713 A1 | 1/2001 |
| DE | 10063414 A1 | 6/2002 |
| DE | 10120542 A1 | 11/2002 |
| DE | 10133400 A1 | 2/2003 |
| DE | 10252506 A1 | 5/2004 |
| DE | 60205386 T2 | 5/2006 |
| EP | 1084889 A1 | 3/2001 |
| EP | 1213173 A2 | 6/2002 |
| EP | 1310715 A1 | 5/2003 |
| EP | 1213173 B1 | 1/2008 |
| GB | 2408972 A | 6/2005 |

* cited by examiner

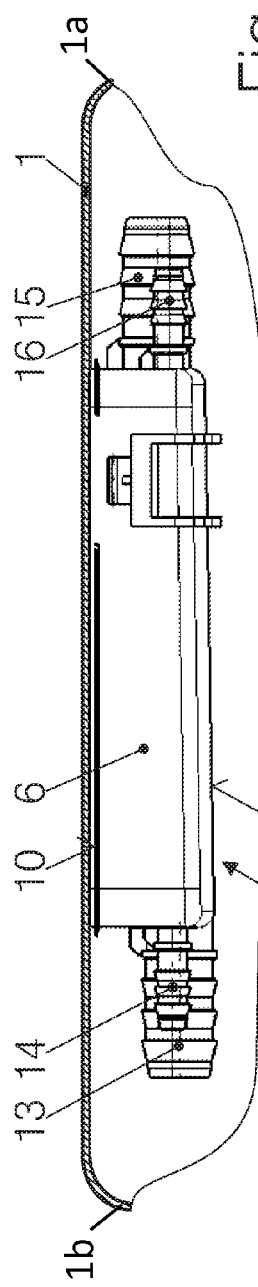
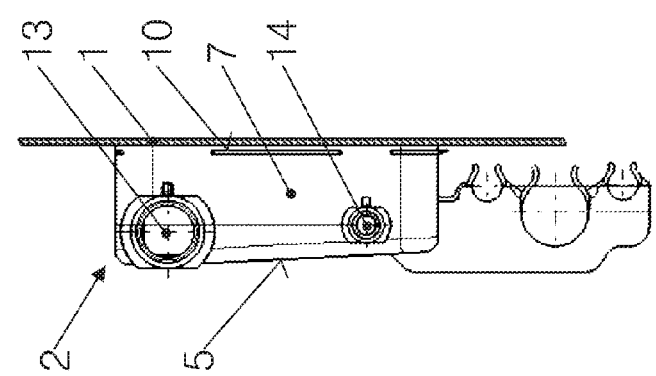
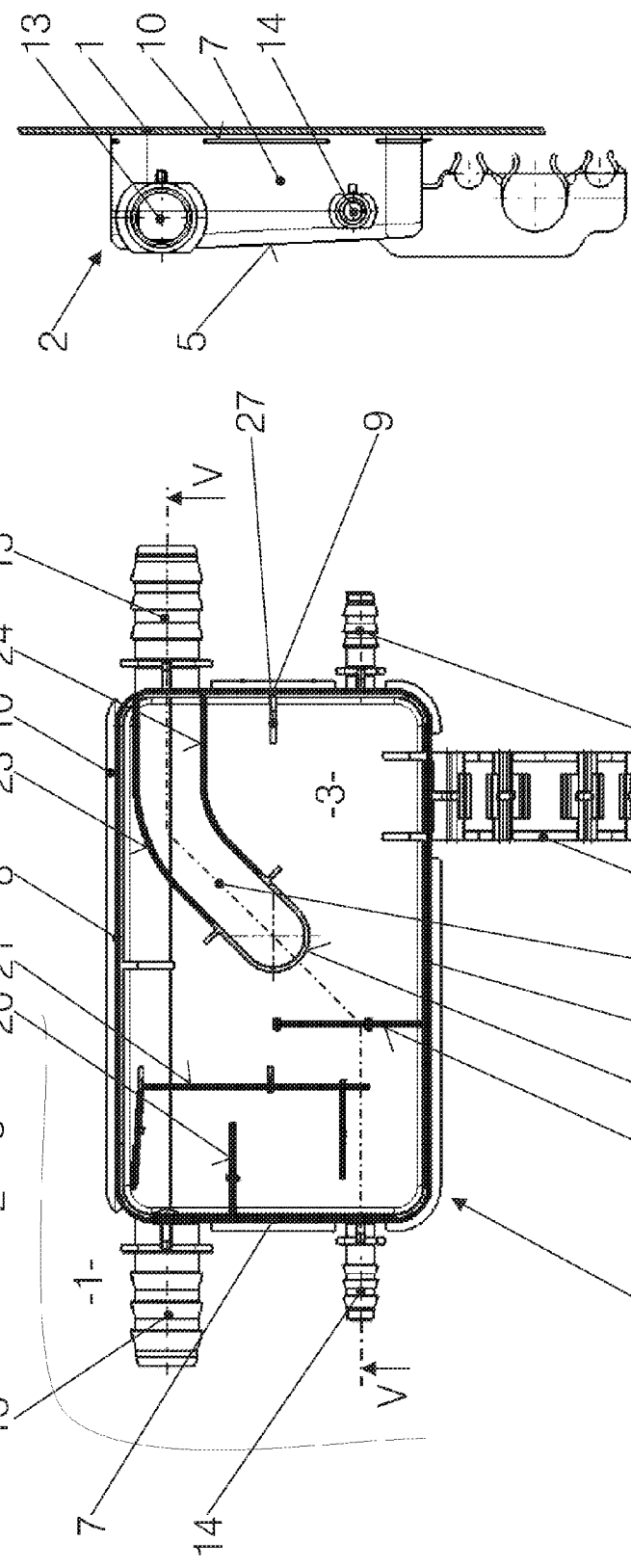

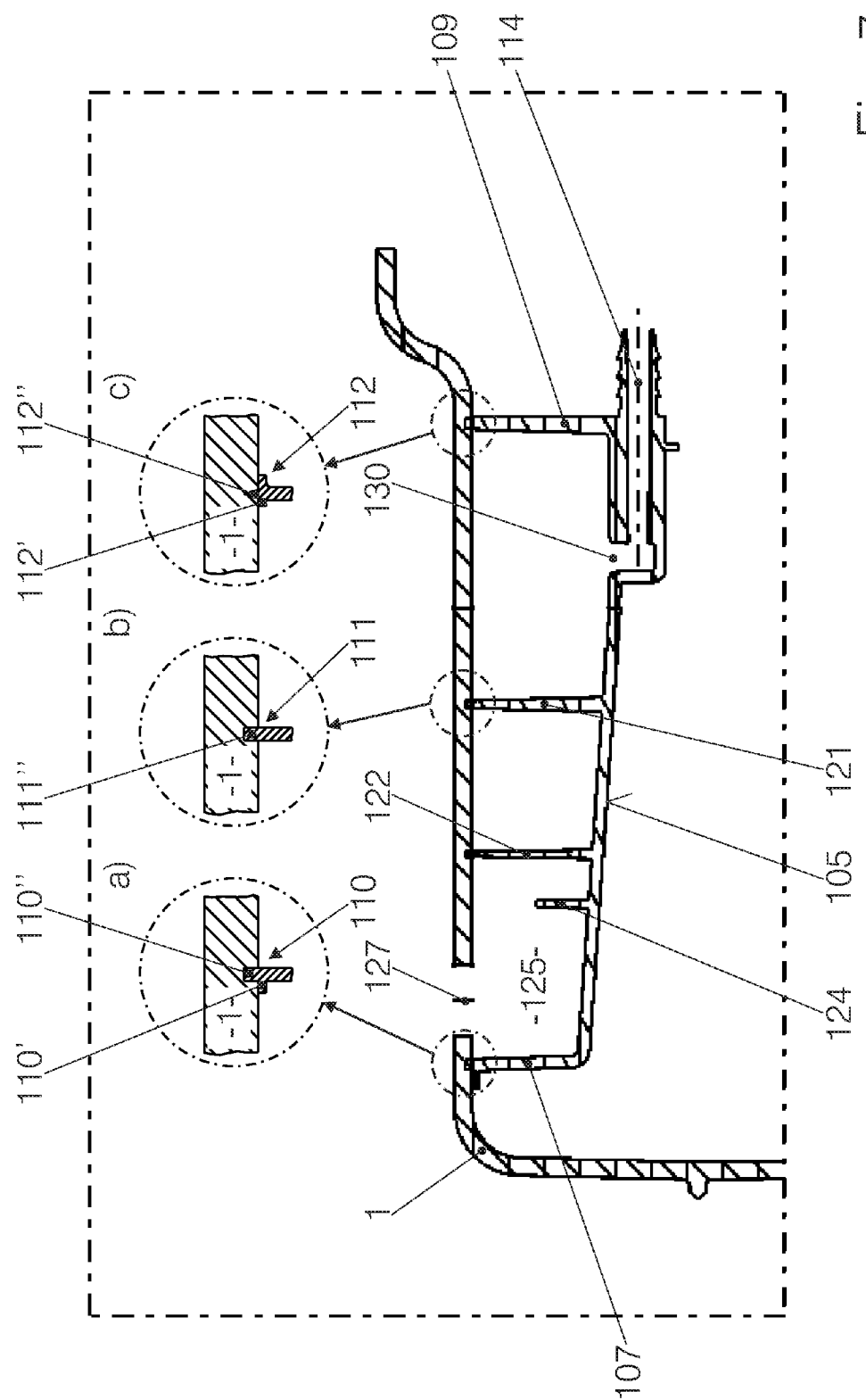

FUEL TANK HAVING A BUILT-IN AUXILIARY TANK

BACKGROUND OF THE INVENTION

The invention relates to a fuel tank made of plastic for motor vehicles, wherein an insert enclosing a space is located in the interior of the fuel tank. The wall of the fuel tank may consist of a single blow-molded piece having a sufficiently large opening or of two pressed or deep-drawn plastic shells which are subsequently joined together. The mentioned shaping processes use a mold, wherein the plastic is molded at a warm state. The walls may also be multilayered in order to minimize permeation of fuel vapors. The insert may be of different kinds; usually it is part of a venting system, such as a separator, a debubbling tank and/or a float chamber.

In the case of conventional fuel tanks made of plastic, the parts of the venting system are individually mounted at the inside of the upper shell either by welding (see, for example, EP 1 310 715 A1) or by attaching them to weld crowns secured in through-holes of the shell (see, for example, EP 1 084 889 A1).

U.S. Pat. No. 4,531,653 discloses a block-shaped fuel tank made of sheet metal, wherein a stack of three rectangular profiled metal sheets is welded to the inside of the planar top wall of the block-shaped fuel tank. These metal sheets are welded together to form a rigid body extending horizontally over the whole base area of the fuel tank. The rigid body defines chambers connected to one another and to the interior of the fuel tank and the atmosphere, respectively. This design is complex and only applicable in the case of a planar top wall made of sheet metal. And even then its durability remains questionable because of the tolerances and because of residual stresses caused by the welding process.

EP 1 213 173 discloses a fuel tank made of plastic, wherein a body defining a closed space, which is therein referred to as an evaporator unit, is fixed by screws to the inside of the top wall of the fuel tank. For this purpose, the wall is provided with undercut support parts, rendering its manufacture difficult and expensive. Also, the body fixed by screws is a likewise complicated part; on top of that, its assembly is very complex.

Finally, US 2008/014 96 42 A1 discloses a fuel tank made of thermoplastic material comprising installation parts which are welded thereto in the first heat when the tank is shaped. In order to achieve that the finished article cools down evenly and without shrinkage distortion by a subsequent gas flushing process, the installation part is connected to the tank wall in such a way that it defines a separate volume together with the tank wall. This volume can be a channel or a surge container arranged at the bottom of the tank. Further applications are not envisaged.

Thus it is the object underlying the invention to form the insert of a fuel tank made of plastic such that great economy of space and design flexibility is achieved, while the wall of the fuel tank and the insert have simple shapes and the assembly of the insert is as easy as possible. This insert is also to be suitable for fuel tanks with top walls having a non-planar spatial shape due to installation conditions in the vehicle.

SUMMARY OF THE INVENTION

The object is achieved by providing an insert in the fuel tank. Due to the fact that the insert is a box which is open at the top, it is cheap to manufacture and can be simply and fast connected by integral bonding to the wall of the tank. The economy of space achieved thereby allows providing a relatively large space in the interior of the insert while its space requirement in the tank is small. The insert offers space for all kinds of inner parts and additionally has functional advantages when used as a debubbling tank.

The insert is a component comprising surfaces forming an open space; thus it can be injection-molded in a simple mold or pressed from a planar starting material. The course of the upper rim of the side walls can easily be adapted to the spatial shape of the wall of the fuel tank, wherein the wall is at the same time the lid which closes up the insert towards the top.

The open shape of the insert also allows providing intermediate walls as installation parts in the insert without additional expenditure during manufacturing, wherein the intermediate walls can likewise be sealingly connected to the wall. The liberty of shaping the insert also allows forming the bottom of the insert to be inclined so as to ensure discharging largely irrespective of its position.

In order to obtain a sealed and durable weld connection, the weld flange at the upper rim of the side walls of the insert includes a weld flange which extends wholly around and comprises a root rib immerging into the wall of the fuel tank and advantageously having a wedge-shaped cross section. The root rib extending towards its pointed rim easily enters into the warm plastic shell, assumes its temperature exceptionally fast and in this way forms a firm connection therewith. Therefore the insert does not have to be heated for its installation, rendering installation easier. The intermediate walls in the insert can also wholly or partly be provided with such a weld flange.

In an advantageous embodiment, the top wall of the fuel tank has an opening through which one region of the interior of the insert is connected to parts mounted outside the fuel tank. The air-vapor mixture led from this opening to an activated carbon filter or a valve is free from fuel droplets due to the intermediate walls serving as traps for liquids and due to the large volume of the space.

In a further especially advantageous embodiment the insert has two connection pieces at opposing side walls, wherein intermediate walls are associated as drop catchers to the one connection piece—an inlet connection piece—and wherein a channel formed by intermediate walls is associated with the other connection piece—an outlet connection piece—, the channel leaving a horizontal slot open at the center of the inlet in the upper region. No liquid is able to pass into the channel through the slot directly at the top wall of the fuel tank. At least one further connection piece opening into the space formed by the insert is provided for operational venting; however, two connection pieces are better.

BRIEF DESCRIPTION OF THE DRAWINGS

FIG. 1: side view of a first embodiment of a fuel tank according to the invention with an insert;
FIG. 2: top view of FIG. 1;
FIG. 3 end view of FIG. 1;
FIG. 7 section 7-7 of FIG. 6 with enlargement bubbles.

DETAILED DESCRIPTION

Figure 4:
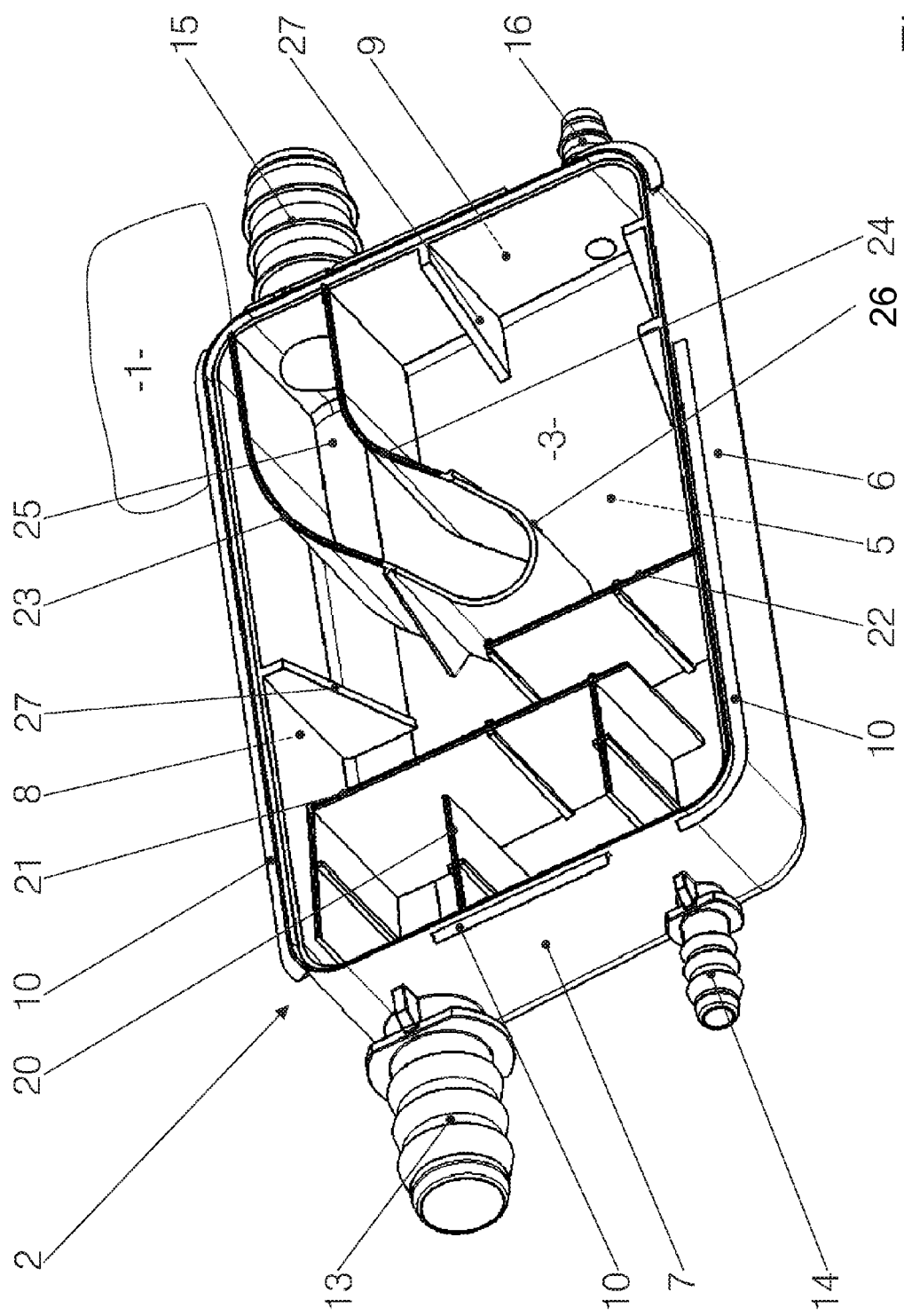
FIG. 4 axonometric view of FIG. 1 as viewed in a skew direction from above, enlarged.
Figure 5:
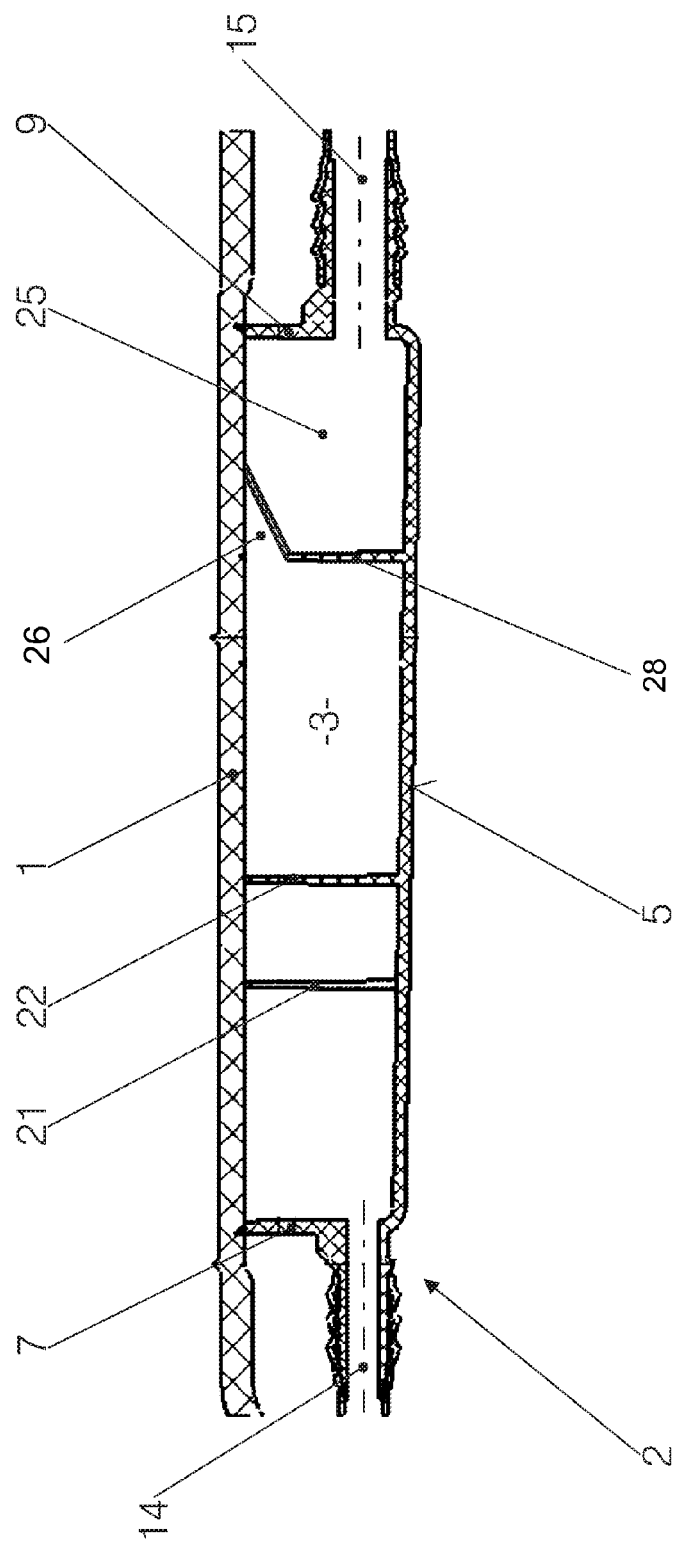
FIG. 5 section 5-5 of FIG. 2.

FIGS. 1 to 5 show a torn-off part only of the top wall 1 of a fuel tank and an insert 2 attached to the inside of the top wall 1 (and portions of walls 1a and 1b), wherein the insert 2 forms a closed space 3. The insert 2 is a component having the shape of a box which is open at the top and consisting of a slightly inclined (see FIG. 3) bottom 5 and vertical side walls 6, 7, 8, 9. The box may also have a cylindrical or otherwise shaped side wall. The upper rims of the side walls 6, 7, 8, 9 have a weld flange 10 integrally bonded to—welded to—the wall of the fuel tank.

A first connection piece 13 and a second connection piece 14 protrude from the side wall 7, a third connection piece 15 and a fourth connection piece 16 protrude from the side wall 9. The connection pieces 13, 14, 15, 16 are integral with the side walls 7, 9 and provide a connection between the space 3 in the interior of the insert 2 and pipes or hoses. Neither the pipes or hoses nor their target stations are shown: from the connection piece 13 to a shut-off valve with floater, from the connection piece 15 to an activated carbon filter, from spaced-apart operational vent holes with rollover valve to the connection pieces 14, 16. A cantilever 17 for supporting conduits is shaped onto the side wall 6. It is possible to also provide stiffening ribs 27 (see FIG. 4) in the space 3.

Herein the inner parts are various intermediate walls. The intermediate walls 20, 21, 22 extend from the bottom 5 to the tank wall 1 and are welded thereto. They form baffles with deflector surfaces as traps for liquids. The intermediate walls 23, 24 form a channel 25 leading to the connection piece 15. For the most part, they extend from the bottom 5 to the tank wall 1; however, there is a gap 26 (see FIG. 5) between their portion 28 extending into the center of the insert and the wall 1 of the tank, through which gap 26 gas is able to enter at the highest point of the space 3 into the channel 25. The flow direction during fuelling runs from the connection piece 13, past the intermediate walls 20, 21, 22, through the gap 26 into the channel 25 and through the connection piece 15 to an activated carbon filter. During operation fuel vapors are able to enter into the space 3 through the connection pieces 14, 16. Separated liquid is collected at the bottom 5 and is able to get back into the tank, for example, through the connection pieces 14, 16.

Figure 6:
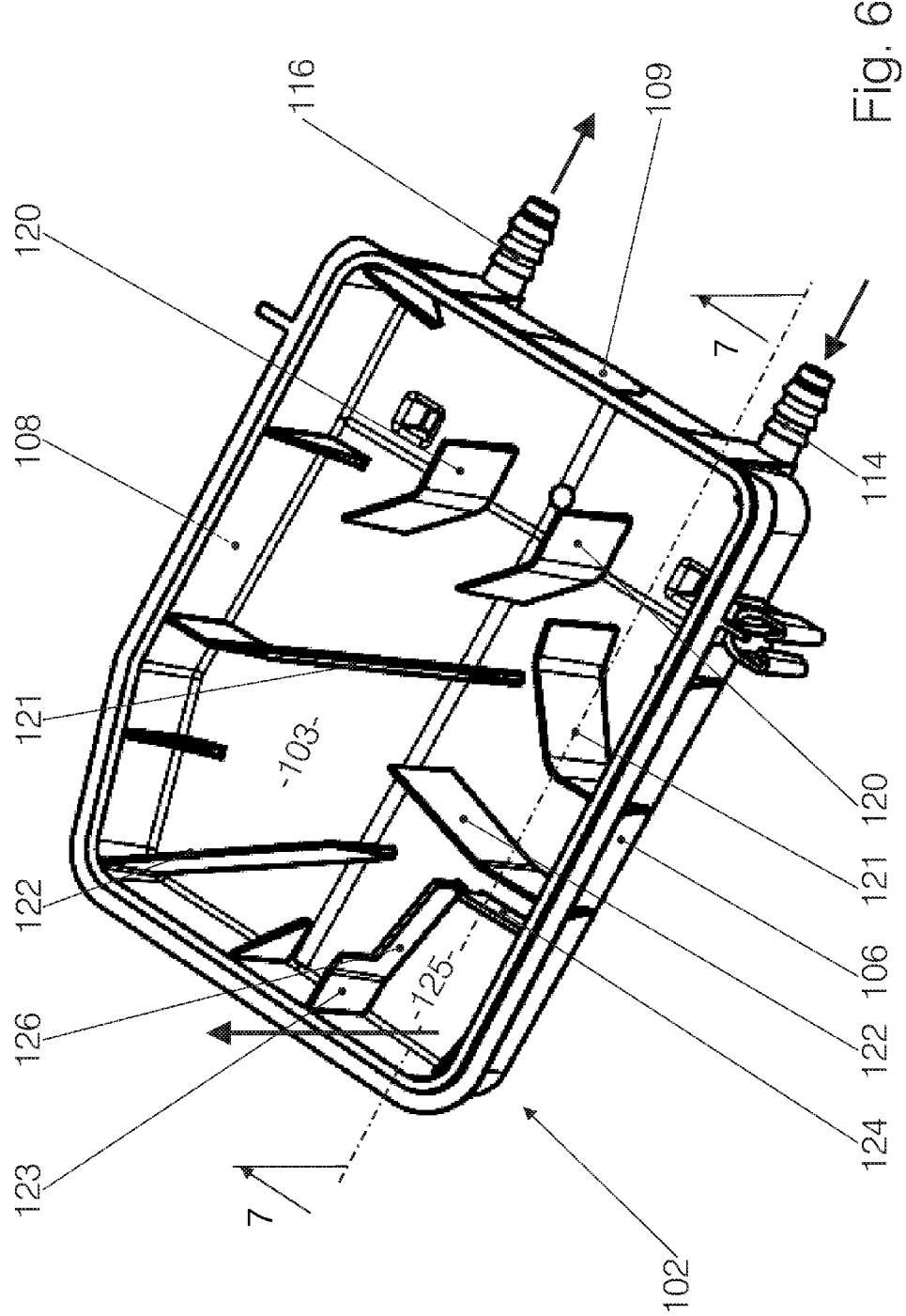
FIG. 6 axonometric view of a second embodiment.

In the embodiment of FIGS. 6 and 7, corresponding parts have reference numerals increased by 100. The embodiment of FIGS. 6 and 7 differs from the previously described embodiment essentially in that only at the side wall 109 there are provided two inlet connection pieces 114, 116 for operational venting and in that the outlet opening 127 leading to an activated carbon filter is located in the top wall of the fuel tank. The pairs of intermediate walls 120, 121, 122 extending up to the tank wall again serve as traps for liquids. The intermediate wall 123 has a portion 126 not extending up to the wall 1 of the tank and the whole intermediate wall 124 does not extend up to the wall 1.

Another small difference consists in that fact that the connection pieces 114, 116 are arranged at the side wall 109 low enough to be situated under an opening 130 located at the lowest point of the inclined bottom 105.

FIG. 7 further shows different shapes of the weld flange 110 in enlargement bubbles. The weld flange 110 of the side wall 107, as seen in cross section, consists of a support surface 110' and a root rib 110". The weld flange 112 of the side wall 109, as seen in cross section, consists of a support wall 112' and a root rib 112". An upper rim 111" of the intermediate wall 121 simply immerges into the wall 1 of the tank.

The invention claimed is:

1. A plastic fuel tank comprising:
a plurality of walls defining an interior space;
an insert located in the interior space, the insert comprising a box made of plastic, the box having a bottom wall and side walls connected to and extending upwardly from the bottom wall, wherein upper rims of the side walls define an open top of the insert, and wherein the upper rims are integrally bonded to one wall of the plurality of walls of the fuel tank whereby the one wall closes the open top of the insert such that the bottom walls and side walls of the box and the one wall of the plurality of walls define a closed space within the insert;
a plurality of inner parts located within the closed space, wherein the plurality of inner parts include intermediate walls which are also integrally bonded to the one wall of the plurality of walls of the fuel tank and define a liquid-gas separator; and
at least one connection piece formed on one of the side walls of the box and communicating with the closed space, the at least one connection piece being adapted to receive a pipeline which communicates with the closed space, wherein the bottom wall of the insert is inclined and the at least one connection piece is located at a lowest point of the side wall relative to the bottom wall of the fuel;
wherein the at least one connection piece comprises a first connection piece at a first side wall and a second connection piece at a second side wall opposing the first side wall;
(a) wherein the liquid-gas separator is defined by first intermediate walls extending from the bottom wall up to the one wall of the fuel tank are provided as drop catchers in the insert at the side of the first connection piece, and
(b) wherein the liquid-gas separator is further defined by second intermediate walls wherein the second intermediate walls comprise a first portion and a second portion that is continuous with the first portion, wherein the first portion extends upwardly from the bottom wall of the insert to the one wall and wherein the second portion extends upwardly from the bottom wall of the insert and the first portion and second portion form a channel in the insert at the side of the second connection piece, wherein the channel leads from the second connection piece into the closed space and wherein an opening is provided at an end of the channel between an upper rim of the second portion and the one wall such that the channel is in flow connection to an upper region of the closed space.

2. The fuel tank according to claim 1, wherein the one wall of the plurality of walls of the fuel tank has an opening through which one region of the closed space of the insert is connected to parts mounted outside the fuel tank, wherein the region is partly surrounded by some of the intermediate walls and at least one further intermediate wall is arranged between the region and the at least one connection piece.

3. The fuel tank according to claim 1, wherein the at least one connection piece further comprises at least one further connection piece which opens into the closed space.

* * * * *